United States Patent [19]
Jones et al.

[11] 3,781,956
[45] Jan. 1, 1974

[54] CUTTING INSERT

[75] Inventors: Dennis G. Jones, Greensburg; James F. McCreery, Latrobe, both of Pa.

[73] Assignee: Kennametal Inc., Latrobe, Pa.

[22] Filed: Feb. 23, 1972

[21] Appl. No.: 228,605

[52] U.S. Cl............................................... 29/95 R
[51] Int. Cl.............................................. B26d 1/00
[58] Field of Search................................... 29/95, 96

[56] References Cited
UNITED STATES PATENTS
3,504,413  4/1970  Siewert et al...................... 29/95 X
3,395,434  8/1968  Wirfect................................ 29/95

*Primary Examiner*—Leonidas Vlachos
*Attorney*—Melvin A. Crosby

[57] ABSTRACT

A cutting insert, especially a molded cutting insert formed of a hard wear resistant material, such as a is super-chilled carbide. The insert comprises a body having parallel top and bottom faces and a peripheral wall and is polygonal when viewed perpendicular to the faces. Cutting edges are formed at the juncture of at least one of the faces and the peripheral wall and a recess is formed in the one face extending inwardly A heat the center and each recess is in the form of a skewed or helical plane to impart a shearing type cutting action to the insert when it is presented to a workpiece.

11 Claims, 16 Drawing Figures

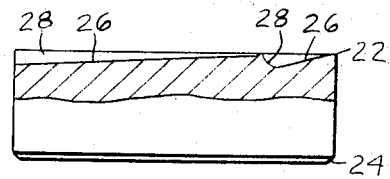
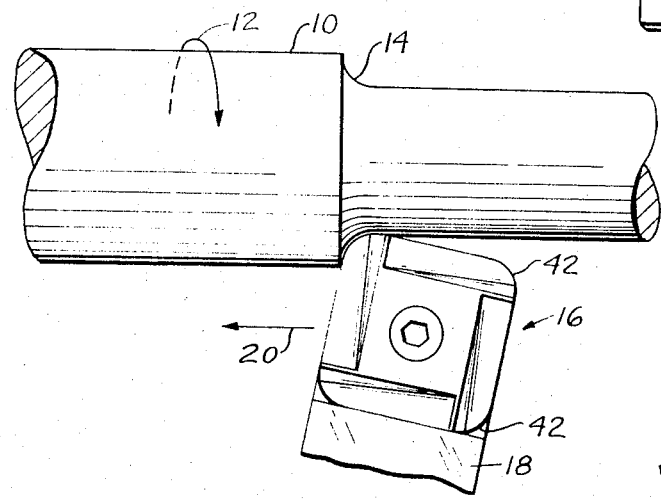
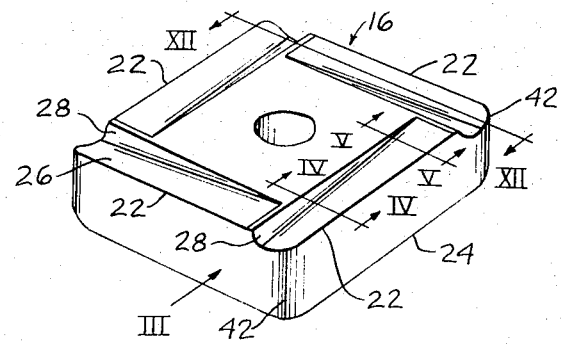
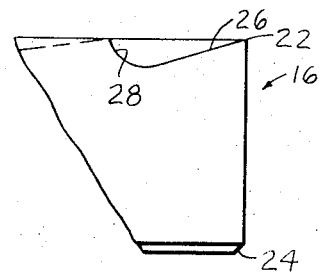
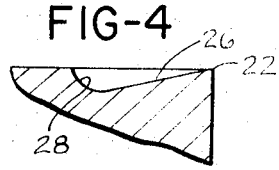
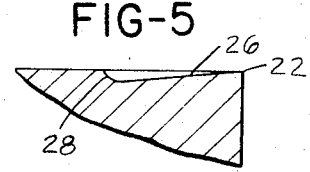
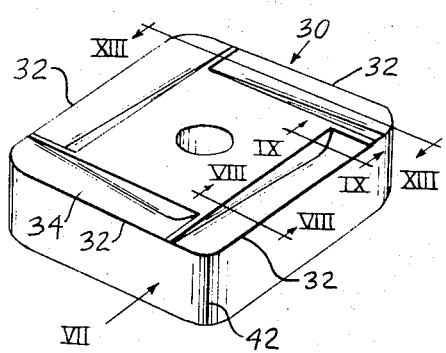

CUTTING INSERT

The present invention relates to cutting inserts, particularly to molded cutting inserts, and is especially concerned with a novel manner of forming the recess adjacent the cutting edge of the insert to create a shearing action when the cutting edge is presented to a workpiece.

Molded inserts of the nature with which the present invention is concerned are generally formed of a hard wear resistant material such as a cemented hard metal carbide. Tungsten carbide and mixtures thereof with other carbides, such as titanium carbide, are often employed for this purpose.

Cutting inserts of the nature referred to are widely employed in metal turning, including roughing, intermediate, and finishing operations.

Such inserts, unless specially formed, present negative back rake to the work which produces a sort of tearing action during cutting. Positive back rake yields more of a shearing action during cutting, but inserts formed to produce positive back rake are often difficult to form and are, thus, expensive.

A cutting insert which can be formed easily by molding techniques and produce a shearing action at the cutting edge is, therefore, a desirable product. Such an insert would be broadly applicable to various situations, would cut easily and quietly and would produce a good finish on the work.

With the foregoing in mind, a primary objective of the present invention is the provision of a cutting insert which produces a shearing action on the work and which is adaptable to substantially all cutting conditions.

Another object of this invention is the provision of a cutting insert, especially a molded cutting insert, which is relatively simple in shape so that it can be easily molded to accurate configuration, while at the same time being adaptable to a wide range of machining conditions.

The foregoing objects as well as still other objects and advantages of the present invention will become more clearly apparent upon reference to the following detailed specification taken in connection with the accompanying drawings in which:

FIG. 1 shows an insert according to the present invention during a turning operation.

FIG. 2 is a perspective view of an insert according to the present invention drawn at somewhat enlarged scale.

FIG. 3 is an elevational view drawn at enlarged scale and looking in at the insert of FIG. 2 as indicated by the arrow III on FIG. 2.

FIGS. 4 and 5 are fragmentary sectional views drawn at the same scale of FIG. 3 and indicated by lines IV—IV and V—V on FIG. 2.

FIG. 6 is a perspective view like FIG. 2 but shows a different type insert.

Figure 7:
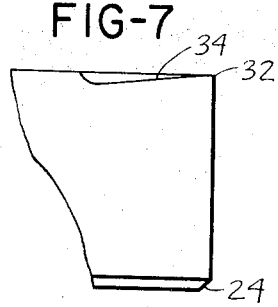

FIG. 7 has an elevational view drawn at enlarged scale and looking in at one corner of the insert of FIG. 6 as indicated by arrow VII on FIG. 6.

Figure 8:
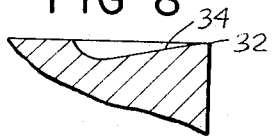
Figure 9:
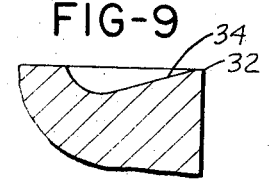

FIGS. 8 and 9 are fragmentary sectional views drawn at the same scale as FIG. 7 and indicated by lines VIII—VIII and IX—IX on FIG. 6.

Figure 10:
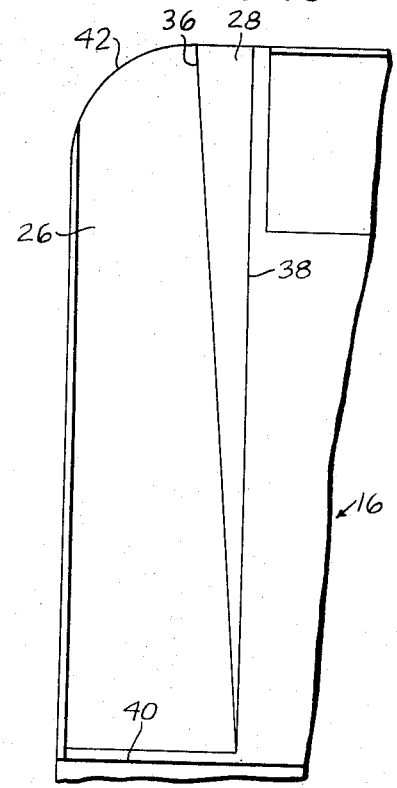

FIG. 10 is a plan view looking down on top of one of the cutting edges of the insert of FIG. 2 and drawn at greatly enlarged scale.

Figure 11:
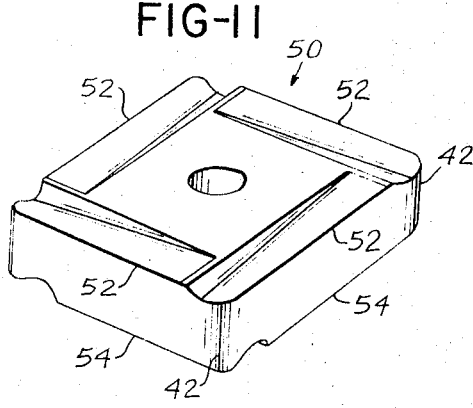

FIG. 11 is a perspective view like FIG. 2 but showing an insert in which cutting edges are formed on both sides thereof.

FIG. 12 is a section indicated by line XII—XII on FIG. 2.

Figure 13:
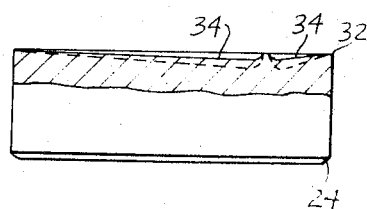

FIG. 13 is a section indicated by line XIII—XIII on FIG. 6.

Figure 14:
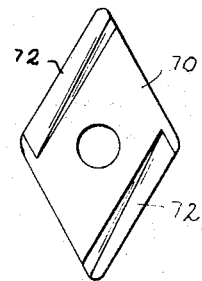

FIG. 14 is a plan view showing a parallelogram shaped insert.

Figure 15:
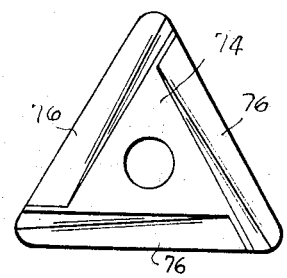

FIG. 15 shows the adaptation of the present invention to a triangular insert.

Figure 16:
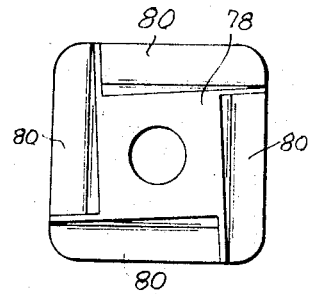

FIG. 16 is a plan view of a square insert in which the opposite sides of the formed edge parts of the insert are parallel.

BRIEF SUMMARY OF THE INVENTION

According to the present invention, a cutting insert is provided, preferably a molded insert, formed of cemented tungsten carbide or a like hard wear resistant material. The insert comprises a body having parallel top and bottom faces and a peripheral wall which may be perpendicular to the planes of the top and bottom faces of the insert.

The faces of the insert are polygonal when viewed in a direction perpendicular thereto so that the insert has corners with straight edges extending between the corners. The insert is provided with cutting edges at the juncture of the peripheral wall with at least the plane of one of the top and bottom faces of the insert and a recess is formed in the said one face of the insert adjacent each of the cutting edges.

Each recess is formed by a plane leading from the respective cutting edge toward the center of the insert and formed to a skewed, or helical, configuration about a reference line substantially parallel to the respective cutting edge. At the edge of the skewed, or helical, plane, the recess terminates in an abrupt rise which may be parallel to the respective cutting edge.

The recess for each cutting edge can be formed in such a manner that the angularity of the upper surface of the recess with reference to the plane of the adjacent face of the insert increases in a direction away from the respective corner of the insert or so that it decreases in the same direction.

DETAILED DESCRIPTION OF THE INVENTION

Referring to the drawings somewhat more in detail, FIG. 1 shows a workpiece 10 which is being rotated as indicated by arrow 12 and which is being machined, as at the shoulder area 14, by insert 16 according to the present invention which is mounted on a holder 18 and which is being moved relative to workpiece 10 in the direction of arrow 20.

The holder supports the insert to provide for clearance of from about 5 to 6 degrees between the side of the insert and the plane of shoulder 14 and about the same degree of clearance between the front of the insert and the side of the workpiece adjacent thereto.

More specifically, looking at FIG. 1, the axis of insert 16, which is perpendicular to the plane of the top of the insert, is tilted relative to the horizontal plane of the axis of rotation of workpiece 10 so as to incline to the left in an upward direction at about 5° to 6° and to incline toward the workpiece in an upward direction at about the same angle. This tilting of the insert will produce the desired front and side clearance at the workpiece and the angle of inclination of the bottom wall of the recess adjacent the cutting edge and transverse to the recess will produce the back rake.

Insert 16 is shown in perspective in FIG. 2 and will be seen to be provided with cutting edges 22 extending along the periphery of the insert at the juncture of the peripheral wall of the insert with the plane of the top face of the insert. Adjacent each cutting edge 22 is a recess 26 and each recess at the side remote from the respective cutting edge terminates in an abrupt arcuate rise 28.

The portion of the recess between abrupt rise 28 and a cutting edge 22 is in the form of a skewed, or helical, plane which makes an angle of 90° or less with the adjacent portion of the peripheral wall and which angle changes in the longitudinal direction of the recess. In respect of the insert shown in FIG. 2, the end of the recess which opens through the corner of the insert, and is shown in FIG. 3, is disposed at such an angle that the included angle between the top surface of the recess and the adjacent peripheral wall is about 75°.

FIGS. 3 and 4, which are sections taken farther along the recess, will show that the angularity thereof gradually decreases until the recess at the most shallow end thereof runs out to about zero depth and the top surface thereof makes an angle of substantially 90° with the adjacent peripheral wall.

As will be seen in FIGS. 10 and 12, there is a narrow land area 23 immediately adjacent cutting edge 22 which is formed by the bottom wall of the recess intersecting the plane of the top face of the insert along a line parallel to and closely adjacent the cutting edge 22. This land area might, for example, be about 0.010 inches in width while the width of the recess could be as much as 0.25 inches, measured from the cutting edge to the land area. The abrupt rise intersects the plane of the face of the insert in a straight line, and which line is indicated at 38 in FIG. 10.

FIG. 10, at 36, also indicates the region where the filletted abrupt rise 28 merges with the bottom wall portion of recess 26.

FIGS. 6, 8, 9 and 13 shows an insert 30 having cutting edges 32 at the juncture of the peripheral wall of the insert with the plane of the top face thereof and with recesses 34 disposed adjacent the cutting edges. Recesses 34 are formed in the same manner as recesses 26 of FIG. 2, except that the plane of the outer region of each recess is skewed, or is helical, in the opposite direction from that of the insert of FIGS. 1, 2, 3 to 5 and 12.

Thus, wheareas in FIG. 2, the bottom wall portion of the outer region of the recess has its greatest angularity adjacent the corner, in FIG. 6 the plane of the bottom wall portion of the recess is twisted in the opposite direction and the recess adjacent the corner of the insert makes the greatest angle with the peripheral wall. The outer bottom wall region of the recesses in FIG. 6, as indicated at 34, and the details in respect of the configuration of the recess at different points along the recess are shown in FIGS. 7, 8, 9 and 13.

All of the inserts illustrated have rounded corners, as indicated at 42, and the corners may be rounded with substantial radius up to, for example, 0.250 inches.

The insert in FIG. 11, indicated at 50, conforms with either of the inserts of FIGS. 2 and 6, except that cutting edges 52 are formed on the insert in the plane of the upper face of the insert, whereas cutting edges 54 are formed in the plane of the lower face of the insert.

All of the inserts are indexable so that the corners can be presented one after the other to the work, while the insert of FIG. 11 is also invertable so that eight corners and cutting edges are available for work.

Where the inserts are one-sided, as in the case of FIGS. 2 and 6, it is preferable to form a beveled region 24 at the juncture of the peripheral wall with the plane of the bottom face of the insert as shown in FIGS. 3 and 7.

FIG. 14 shows in plan view an insert 70 which is in the form of a parallelogram and which has an opposite side edges recessed 72 formed according to the present invention.

FIG. 15 shows in plan view a triangular shaped insert 74 having recesses 76 formed along the three edges thereof in conformity with the teachings of the present invention.

FIG. 16 shows in plan view a square insert 78 having recesses 80 extending along the four edges thereof according to the present invention, but whereas in the modifications described heretofore, the back wall of each recess was parallel to the outer edge thereof, in FIG. 16 the back wall of each recess extends at an acute angle to the outer edge thereof and the bottom wall part of each recess is substantially the same width from end to end of the recess.

The inserts can be secured to a pocket in a holder by a clamp screw or a clamp pin, or the inserts may be clamped in the pocket of the holder by a top clamp, either with or without a clamping screw or a clamping pin.

The inserts according to the present invention are relatively simple to fabricate and can be molded by standard molding techniques.

Modifications may be made within the scope of the appended claims.

What is claimed is:

1. A cutting insert comprising: a body of hard wear resistant material having top and bottom faces in spaced parallel planes and a peripheral wall extending between said faces and perpendicular thereto, said faces being polygonal whereby said body has corners, cutting edge means at the juncture of said peripheral wall and at least one of said planes and extending from at least one corner of the insert toward a next adjacent corner thereof and disposed in its entirety in said one plane, and recess means extending longitudinally along said cutting edge means between the cutting edge means and the center of said body, said recess means when viewed in transverse cross section comprising an outer region adjacent the respective cutting edge means leading inwardly and downwardly in a direction away from said peripheral wall and an inner region remote from the respective cutting edge means and leading upwardly from the inner edge of said outer region to said one plane, said outer region when viewed in transverse cross section being disposed at an angle of inclination to said one plane which progressively changes in the same sense in the direction from one longitudinal end of said recess toward the other longitudinal end thereof whereby said outer region is substantially in the form of a skewed, or helical, plane.

2. A cutting insert according to claim 1 in which the said change in the angle of inclination of said outer region of said recess means is in the positive sense when progressing from said one corner along the length of said recess.

3. A cutting insert according to claim 1 in which the said change in the angle of inclination of said outer region of said recess means is in the negative sense when progressing from said one corner along the length of said recess.

4. A cutting insert according to claim 1 in which the line of intersection of said inner region with said one plane is substantially parallel to said cutting edge means.

5. A cutting insert according to claim 1 in which said inner region is curved and blends with said outer region at the inner edge of the outer region while intersecting said one plane at a steep angle.

6. A cutting insert according to claim 1 in which the outer edge of said outer region intersects said one plane adjacent said cutting edge means and forms a narrow land area along said cutting edge means.

7. A cutting insert according to claim 1 in which said cutting edge means comprises a cutting edge extending from each corner of the insert toward a next adjacent corner and said recess means comprises extending from each cutting edge toward the center of said body.

8. A cutting insert according to claim 1 in which at least said one corner of the insert when viewed in a direction perpendicular to said one plane is rounded.

9. A cutting insert according to claim 7 in which each corner of said insert when viewed in a direction perpendicular to said one plane is rounded.

10. A cutting insert according to claim 1 in which the included angle between said outer region and said peripheral wall varies upwardly from a minimum of about 75°.

11. A cutting insert according to claim 2 in which the included angle between said outer region and said peripheral wall varies from a maximum of about 90° near one end of said recess to a minimum of about 75° near the other end thereof.

* * * * *